(12) United States Patent
Cok et al.

(10) Patent No.: US 6,822,756 B1
(45) Date of Patent: *Nov. 23, 2004

(54) METHOD OF COMBINING TWO DIGITAL IMAGES

(75) Inventors: Ronald Steven Cok, Rochester, NY (US); John Randall Fredlund, Rochester, NY (US)

(73) Assignee: Eastman Kodak Company, Rochester, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/681,646

(22) Filed: Jul. 29, 1996

(51) Int. Cl.[7] .............................................. G06F 13/00
(52) U.S. Cl. ..................... 358/1.9; 358/450; 358/540
(58) Field of Search ............................ 395/109, 117, 395/135; 358/450, 447, 448, 452, 518, 540, 1.9, 1.18

(56) References Cited

U.S. PATENT DOCUMENTS

| | | | | |
|---|---|---|---|---|
| 4,896,208 A | * | 1/1990 | Moriya et al. ............. 358/450 |
| 5,042,078 A | * | 8/1991 | Oshikoshi et al. .......... 382/163 |
| 5,109,281 A | * | 4/1992 | Kobori et al. .............. 358/450 |
| 5,117,283 A | * | 5/1992 | Kroos et al. ................ 358/450 |
| 5,146,548 A | * | 9/1992 | Bijnagte .................... 358/455 |
| 5,459,819 A | * | 10/1995 | Watkins et al. ............. 395/117 |
| 5,530,793 A | * | 6/1996 | Watkins et al. ............. 395/117 |
| 5,581,377 A | * | 12/1996 | Shimizu et al. ............. 358/450 |
| 5,594,850 A | * | 1/1997 | Noyama et al. ............ 395/133 |
| 5,606,656 A | * | 2/1997 | Yamaguchi ................ 395/126 |
| 5,631,983 A | * | 5/1997 | Ohnishi et al. ............. 358/450 |
| 5,657,395 A | * | 8/1997 | Hirota ....................... 382/163 |

* cited by examiner

*Primary Examiner*—Mark Wallerson
(74) *Attorney, Agent, or Firm*—Frank Pincelli

(57) ABSTRACT

A method of combining a captured customer generated digital image with at least one prestored digital image. The method comprising selecting a prestored digital image, the prestored digital image having a predetermined location where a captured customer generated digital image may be placed. The customer generated digital image is then analyzed so as to determine at least one design attribute for the customer generated digital image. The customer generated digital image or the prestored image is automatically adjusted such that the design attribute for the customer generated digital image and the prestored digital image are within a predetermined relationship.

11 Claims, 10 Drawing Sheets

(8 of 10 Drawing Sheet(s) Filed in Color)

METHOD OF COMBINING TWO DIGITAL IMAGES

FIELD OF THE INVENTION

This is directed to a system and method for producing customized images and merging at least two images obtained from different sources and printing the images in at least one output format.

BACKGROUND OF THE INVENTION

It is known from U.S. Pat. No. 5,459,819 that two individual images can be combined together to form a newly merged single image. Because the images are from two different sources, many visual aspects of one image may be in aesthetic conflict to that of the other. Since the merging of the images is a relatively time consuming and expensive process in relationship to the cost of goods sold, it is important that this be done as effectively as possible so as to avoid any unnecessary recomposing and reprinting of the images.

The present invention solves the foregoing problem by providing a system where customer generated digital images are analyzed for particular design attributes and modified to complement each other and the prestored digital image which they are to be merged with.

SUMMARY OF THE INVENTION

The present invention comprises a method of combining at least one customer generated digital image with at least one prestored digital image, comprising the steps of:

a) selecting a prestored digital image, the prestored digital image having a predetermined location where a customer generated digital image may be placed;

b) analyzing the customer generated digital image so as to determine at least one design attribute for the customer generated digital image; and c) automatically adjusting the customer generated digital image or the prestored image such that the design attribute is adjusted in accordance with a predetermined relationship.

DESCRIPTION OF THE DRAWINGS

The file of this patent contains at least one drawing executed in color. Copies of this patent with color drawing (s) woll be provided by the Patent and Trademark Office upon request and payment of the necessary fee.

In the detailed description of the preferred embodiment of the invention presented below, reference is made to the accompanying drawings, in which.

DETAILED DESCRIPTION OF THE INVENTION

Figure 1:
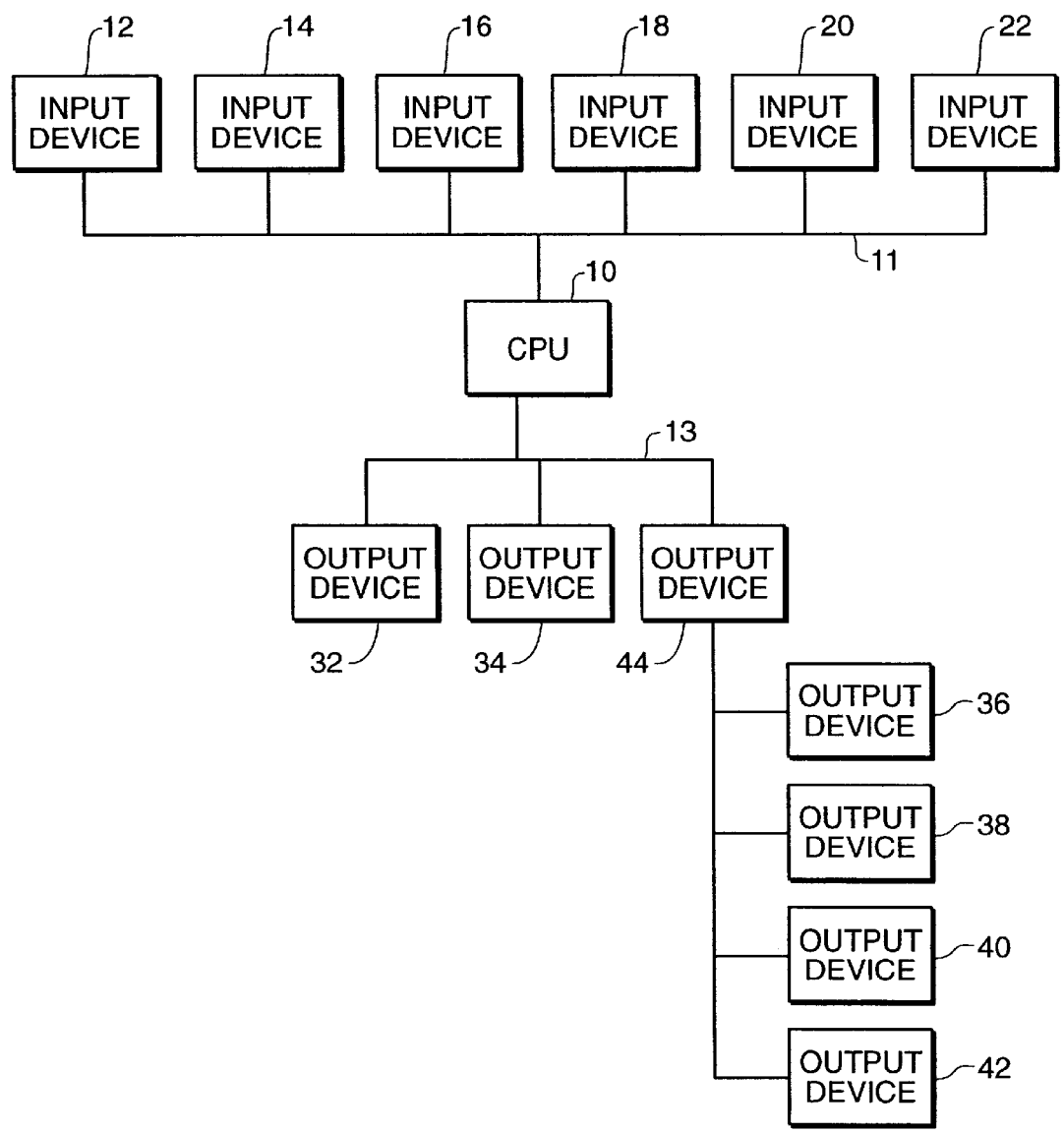
FIG. 1 is a schematic block diagram of a system in accordance with the present invention.

FIG. 1 illustrates in block diagram form, a system for producing customized images and imprinting these customized images onto a variety of different formats. In particular, the system includes a central processing unit (CPU) 10 that can take the form of any appropriate computer. In the particular embodiment illustrated, the central processing unit 10 comprises an Apple Macintosh Computer that is used to control the various input and output devices. A plurality of input devices 12,14,16,18,20,22 are provided for generating an image in a digital format. In particular, first input device 12 comprises a scanner used to scan photographic negatives or slides, both color and monochrome. In the particular embodiment illustrated, the input device 12 comprises a Rapid Film Scanner 2035, made by the Eastman Kodak Company. The input device 12 scans the film and produces a digital output that is forwarded onto the central processing unit 10 by an appropriate data link system 11 for storage in memory and further manipulation. Likewise, input device 14 is provided for scanning photographic pictures, printed or drawn, color and/or monochrome, and producing a digitized signal that represents the image scanned. The Kodak Image Magic Heavy Stock Printer, sold by the Eastman Kodak Company, has a scanner built therein that is capable of scanning photographic pictures, or any type printed material, and providing the appropriate digital signal for the computer 10. The second input device 14 is appropriately connected to the CPU 10 such that the CPU 10 may appropriately receive and manipulate the information obtained therefrom. Likewise, input devices 16,18,20,22 are provided for obtaining digital signals representative of an image from various sources. In particular, input device 16 is a video camera (where the output is digitized), and input device 18 comprises a CD (compact disc)reader for reading digitally stored information on a compact disc. Input device 20 comprises an electronic camera such as the DCS 200 Digital Camera, produced by the Eastman Kodak Company. Input device 22 may be any other input device which is capable of providing a digital signal representative of an image to the CPU, for example, video tape or video laser disc.

The CPU 10 is also connected to a variety of output devices 32,34,36,38,40,42. These output devices are all appropriately connected to the central processing unit 10 by an appropriate data link system 13 as is well known in the prior art. For example, but not the data link system 13 may comprise way of limitation, by an Ethernet data link system. The output device 32, for instance, comprises an electrophotographic printer, such as the Coloredge Printer, sold by the Eastman Kodak Company, which takes the digital image and transfers the digital image onto media which can then be used to produce transfers for use on garments. The output device 34 in the embodiment illustrated is a cathode-ray tube printer (CRT), in particular, the PCD 600 Printer, produced by the Eastman Kodak Company, which focuses a digital image that is displayed on a cathode-ray tube on photographic paper. The output device 36 is a thermal printer for printing digital images onto thermal media. An example of a suitable thermal printer is the XLS 8600 Digital Thermal Color Printer, sold by the Eastman Kodak Company. Output device 38 can be a thermal printer for providing transfers for use on T-shirts, and output device 40 can be a thermal printer for providing transfers for placement on mugs. The last output device 42 illustrated is an ink-jet printer that can be used to imprint the merged image on greeting cards and the like. Various other output devices may be provided for transferring onto various other formats such as garments, mugs, posters, banners, life-size cut-outs, holographic and 3-D imaging, balloons, pens, and pencils.

In the preferred embodiment illustrated, a server 44, such as the Power PC Apple Macintosh Computer, is used for managing information from the CPU 10 and for appropriately providing information to the various printing devices associated therewith. Likewise, if so desired, additional computers may be provided in association with each of the input or output devices for managing information and providing further customizing features as deemed appropriate. For a more simplified system, the input and output devices may all be connected to a single computer. Also it is to be understood that any type suitable printing device may be employed for producing the image in the desired format, the present invention not being limited by the printing devices described herein.

Is to be understood that the CPU 10 may be provided with a monitor for viewing various screens for indicating the status of the system and available options for controlling and/or operating the system as is customarily done in the prior art. The CPU is also provided with an appropriate input device such as a keyboard, touchscreen, or pointing device as are well known in the prior art for allowing the operator to properly operate the system. Thus, the user, who may be the operator and/or customer, can also view the various digital images being input into the system and generated by the system so that the appropriate selections can be made by the user and/or customer. In the CPU 10 stores a plurality of prestored digital images that may comprise a variety of artistic themes each having at least one location for receiving a customer generated digital image. Any one of these prestored digital images may be selected and digitally merged with the customer generated digital image(s) captured by any of the input devices 12,14,16,16,20,22.

A more detailed description of the operation of the system disclosed in FIG. 1 is described in U.S. Pat. No. 5,459,819, which is hereby incorporated by reference in its entirety.

Typically, the customer generated digital images captured by the input devices have different visual characteristics from each other and from the prestored digital image it is to be merged with. The date on which the images were taken, the lighting of the objects, type of film used, the photofinishing parameters used to develop or print the image, and the format in which the image was provided can have a significant effect on the visual characteristics of the digitally captured images. An example of some of the visual characteristics that may be affected are: color density, sharpness, color balance and/or color saturation. When customer generated digital images are combined together and/or with a prestored digital image having significantly different visual characteristics, a very unpleasant appearance can result. The merged images may appear as if they were simply pasted together in much the same manner as a child would cut and paste them together on a piece of paper.

Applicants overcome this problem by first analyzing the digital images to be combined for certain visual characteristics, automatically adjusting the digital images so that they have substantially the same or complementary visual characteristics, and then combining them to form a single merged image.

Figure 2:
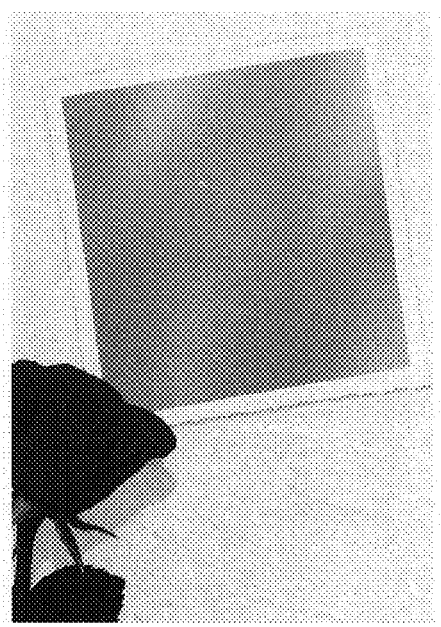
FIG. 2 illustrates an example of a prestored digital image having single location for receiving a customer generated digital image.
Figure 3:
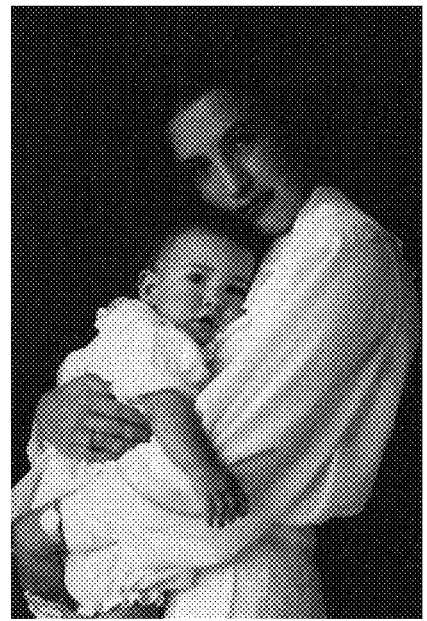
FIG. 3 is a customer generated digital digital image to be merged into the prestored digital image of FIG. 2.

FIG. 2 illustrates a prestored digital image 100 that has been stored in the CPU 10. The prestored digital image 100 has a single location 102 where a customer generated digital image 110, such as illustrated in FIG. 3, can be placed. While in the embodiment illustrated only one location 102 is provided, any desired number of locations may be provided. As can be seen, the sharpness of the prestored digital image 100 is substantially different from the customer generated digital image 110. In particular, the customer generated digital image 110 is substantially less sharp in appearance than the prestored digital image 100. The merging of the two digital images in their current state would produce a merged image having a substantially non-uniform overall appearance. Due to the difference in sharpness, the merged image will give the appearance that the customer generated digital image 110 was pasted into the prestored digital image and will call attention to the low sharpness of the customer generated digital image. Since the customer generated digital image has been captured digitally, certain visual characteristics can be automatically analyzed, for example, by fourier transform, so as to obtain the frequency content of the digital images. If the frequency content of the customer generated digital image is outside a predetermined range from that of the prestored digital image, then one of the digital images is modified by adjusting the frequency content to within the predetermined range which can be done with existing software, for example, Adobe Photoshop software. Preferably, the sharpness is automatically analyzed just after scanning of the digital image prior to combination. The customer image is automatically modified to have substantially the same sharpness as the prestored digital image.

Figure 4:
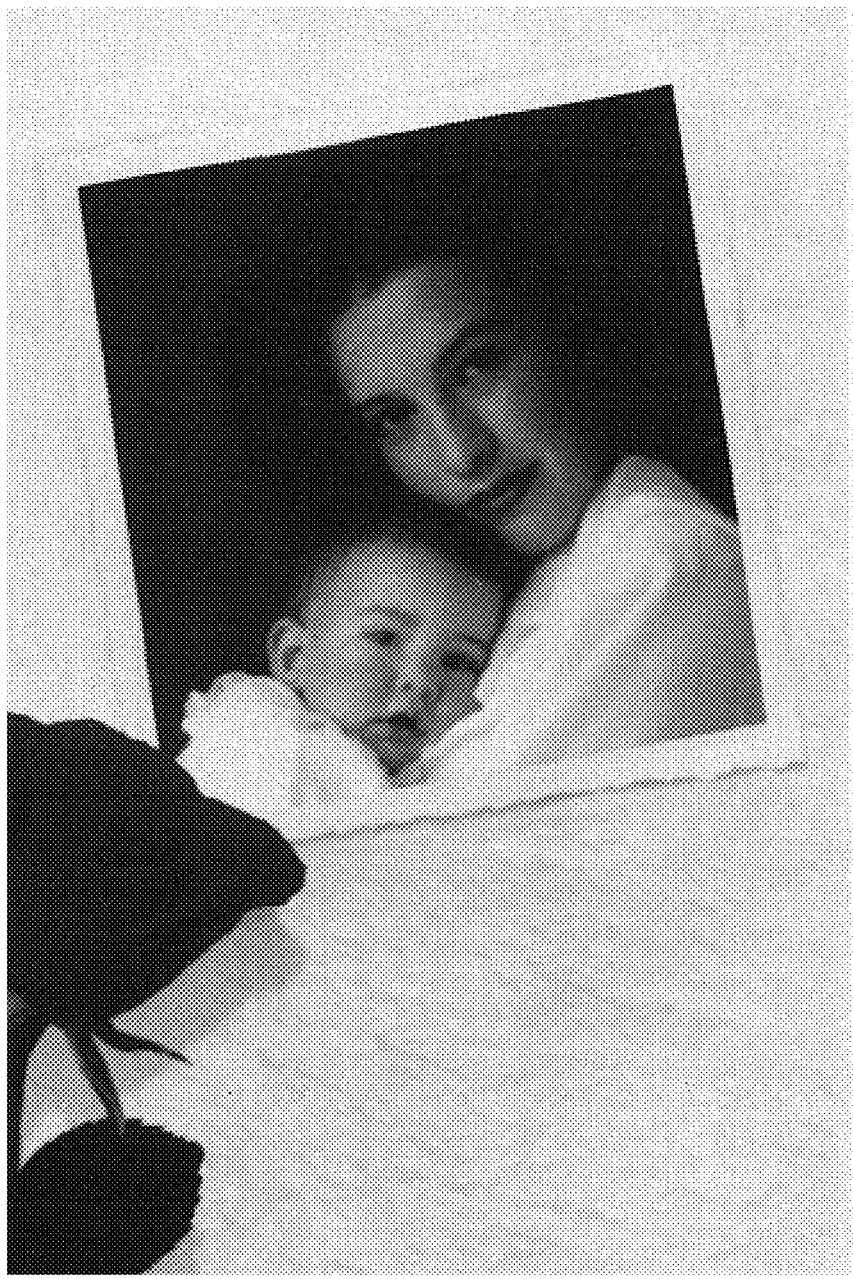
FIG. 4 illustrates the merged image of FIGS. 2 and 3.

FIG. 4 illustrates the customer generated digital image 110 of FIG. 3 merged with the prestored digital 100 and adjusted for sharpness in accordance with the present invention. As can be seen, the merged image provides a substantially uniform appearance.

Figure 5:
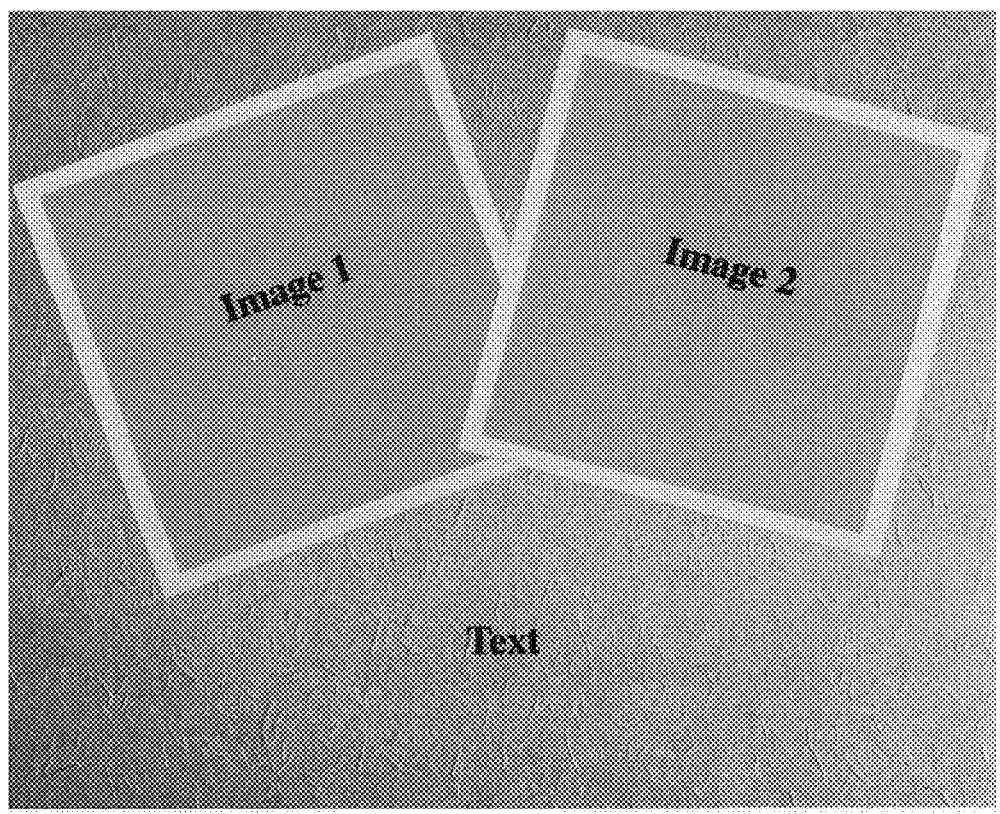
FIG. 5 illustrates a second prestored digital image having two locations for receiving two customer generated digital images.
Figure 6:
FIGS. 6 and 7 illustrate two customer generated digital images.
Figure 7:
Figure 8:
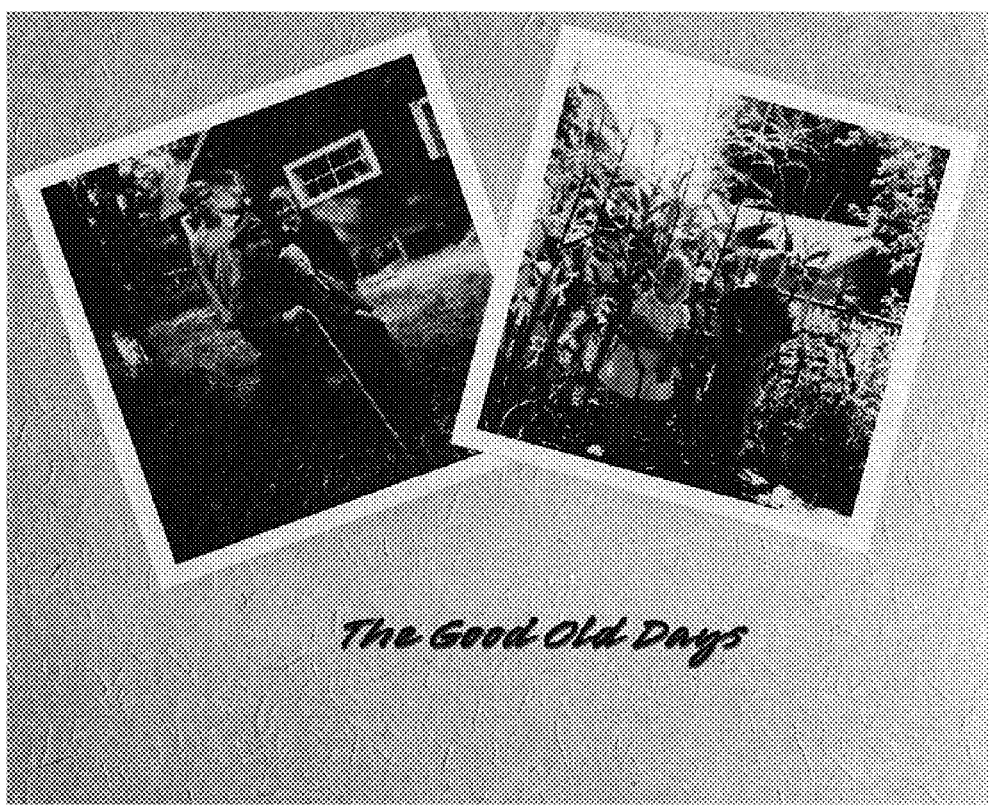
FIG. 8 illustrates the merging of the digital images of FIGS. 6 and 7 with the prestored digital image of FIG. 5.

FIG. 5 illustrates a second prestored digital image 120 having at least two locations 102 for accepting customer generated digital images. FIGS. 6 and 7 illustrate two customer generated digital images 130,132, FIG. 6 illustrates a color digital image, whereas FIG. 7 illustrates a black and white digital image. In the embodiment illustrated, the prestored digital image is a color digital image. The color content of each of the digital images 120,130,132 can be determined by obtaining the average color values for each of the color channels as is well known in the art. Since the digital images are in digital form, these values can be automatically obtained and compared by CPU. If the comparison of these values from image to image is outside predetermined ranges, with respect to each other, then either the prestored digital image and/or the customer generated digital image is automatically modified so that color values are within the predetermined range. After the color values are adjusted, the digital images are merged so as to obtain the merged image as illustrated in FIG. 8. As can be seen, the color values for the customer generated digital images 130,132 are very similar and thus produce a merged image having very uniform appearance as if all the customer digital customer generated digital images were taken at the same time and under the same conditions.

Figure 9:
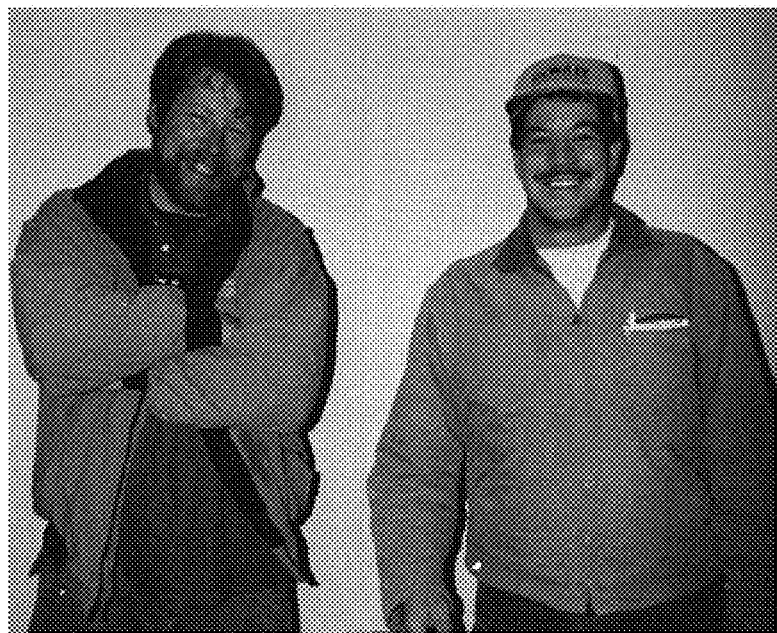
FIG. 9 illustrates yet another captured customer generated digital image.
Figure 10:
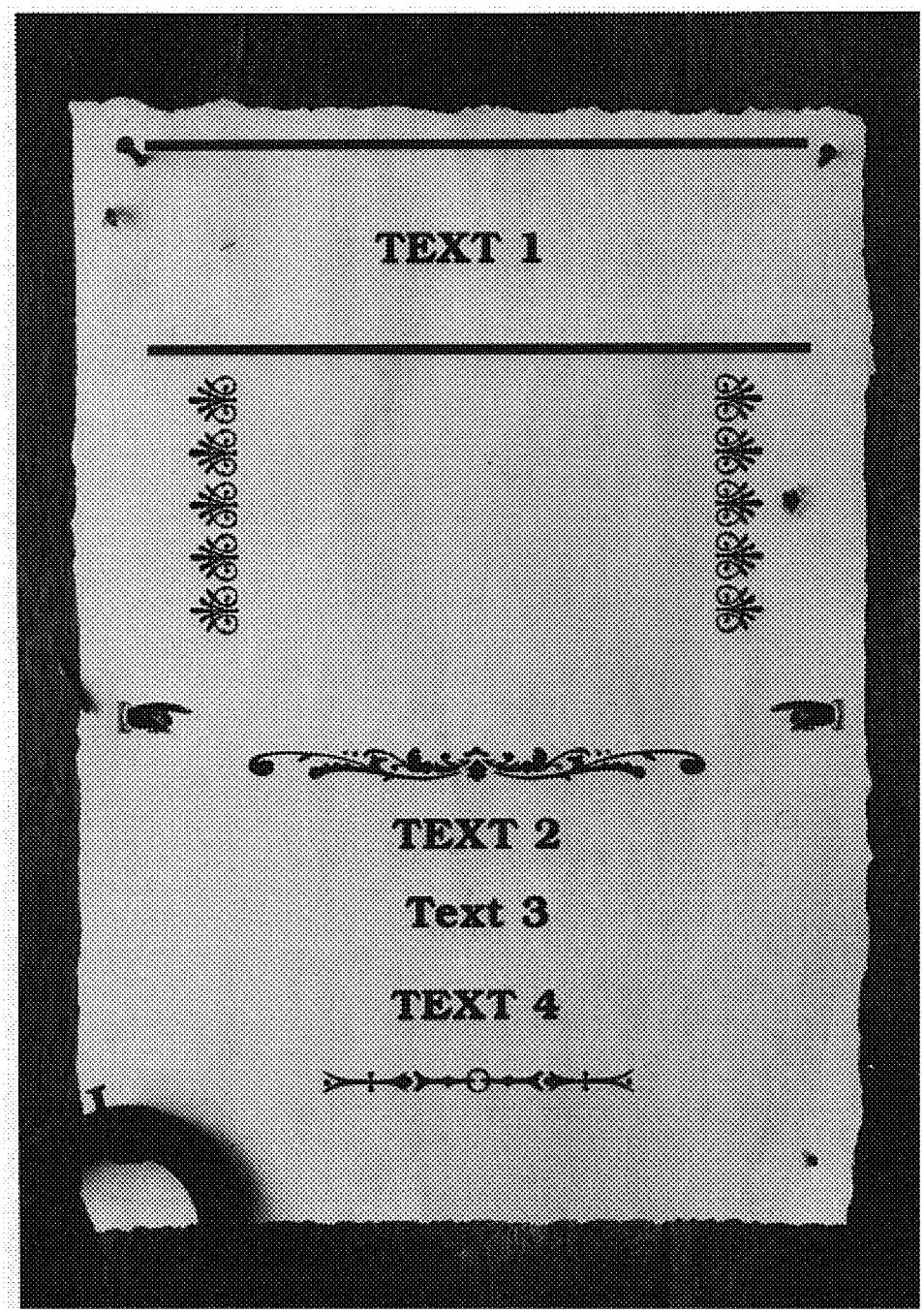
FIG. 10 illustrates another prestored digital image have a location for receiving a captured customer generated digital image.
Figure 11:
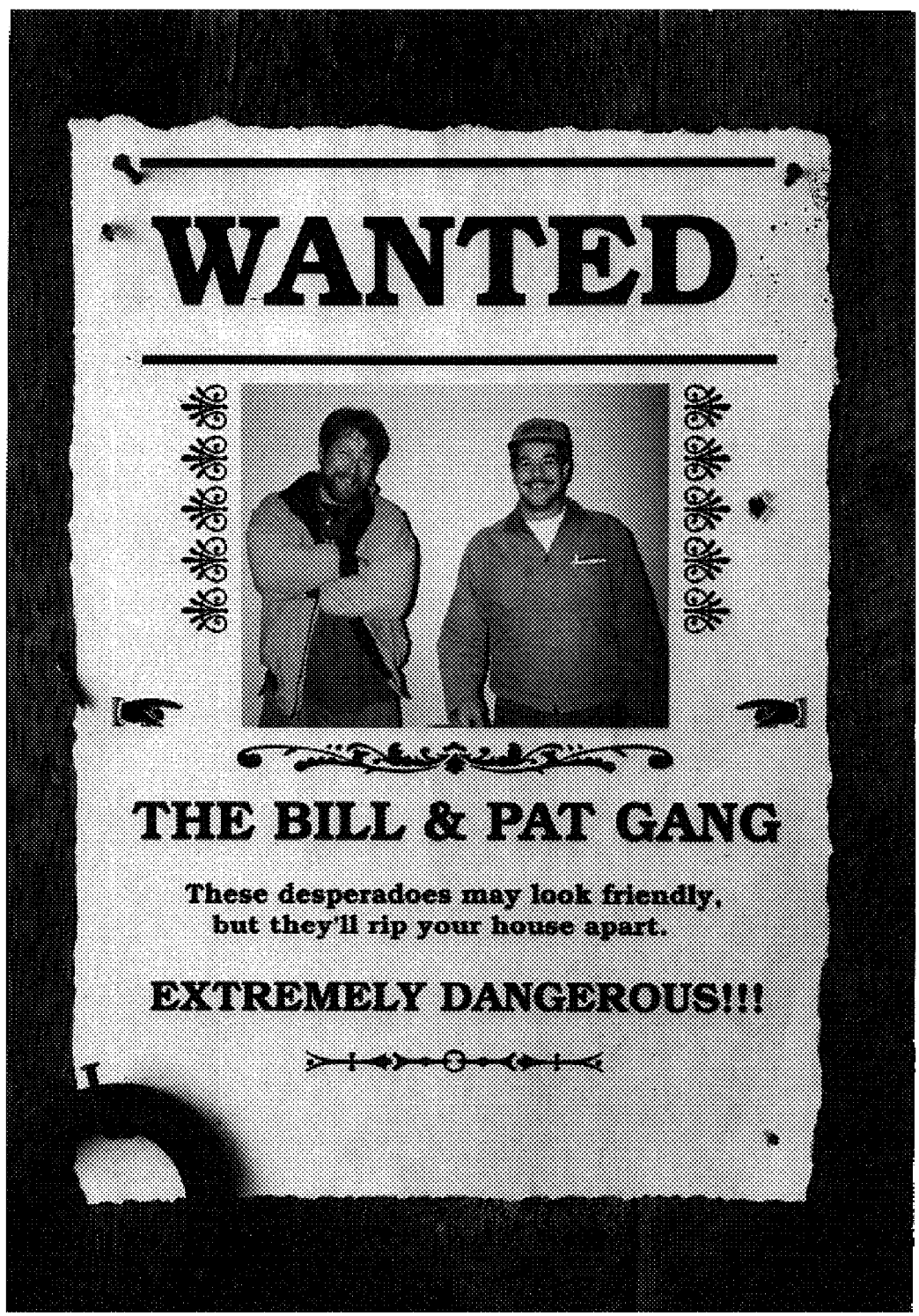
FIG. 11 illustrates the merged image of FIGS. 9 and 10.

FIG. 9 illustrates another customer generated digital image 140 which is to be merged with prestored digital image 142 of FIG. 10. In the embodiment illustrated, the customer generated digital image is in color whereas the prestored digital image 142 is substantially a single tone-type (sepia) image. The color content of the customer generated digital image is modified to substantially match the color content of the prestored digital image and merged so as to form the merged image of FIG. 11.

Figure 12:
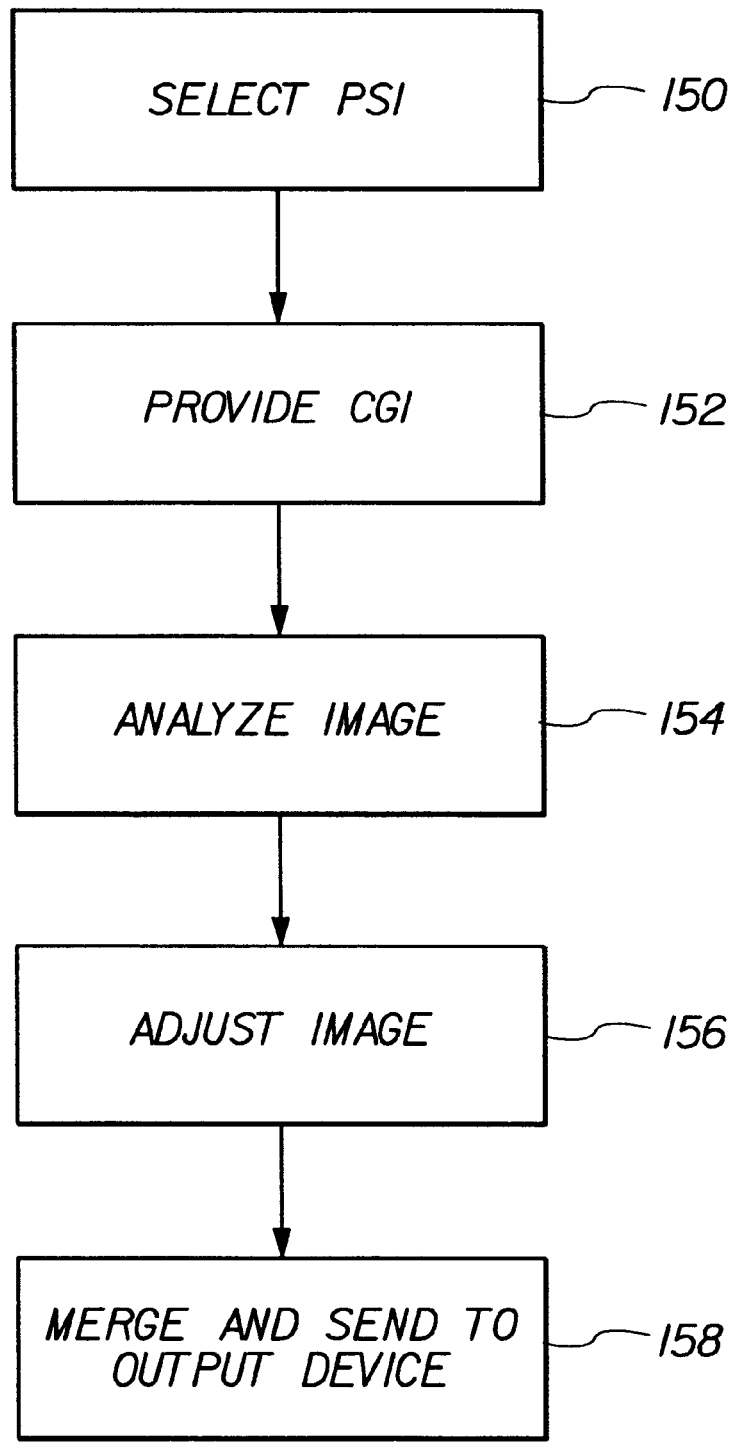
FIG. 12 is a flow chart illustrating the method according to the present invention.

In order to more clearly understand the method of the present invention, a description of the procedure used will be described as illustrated in the flow chart of FIG. 12. First, a customer selects the desired prestored digital image, step 150, in which the customer generated digital image or images are to be placed. The customer, at step, 152, then provides the appropriate customer generated digital image which can be introduced into the system by any of the input devices 12,14,16,18,20,22. This results in the obtaining of a digital record of the captured customer generated digital image or digital images. Since the images are in a digital format, they can be automatically analyzed at step 154 by the CPU for various visual design attributes and/or characteristics such as color balance, color density, sharpness and/or color saturation. A value is obtained for any one or all of these characteristics. Preferably, these characteristics are stored in the memory of the CPU for each of the prestored digital images. If these values have not been stored, the digital record file can be analyzed so as to obtain these values for the prestored digital image selected. The digital record file of the customer generated digital image(s), or the prestored digital image, is automatically adjusted at step 156 by the CPU 10 such that the value of the design characteristic of the customer generated digital image is substantially the same, or within predetermined ranges, as the prestored digital image which they are to be merged with. Alternatively, the value of the design characteristics of the prestored digital image is automatically adjusted to match the customer generated digital image. Also a customer generated digital image may be adjusted with respect to another customer generated digital image within a given range. Optionally, the value of the design characteristics to be modified may be selected so as to complement or contrast each other in accordance with predetermined design relationships. Thereafter, at step 158, the customer generated digital image or images are merged with the prestored digital image and sent to the appropriate output device, for example, for printing.

Thus, the merged image will produce a product having an appearance that is substantially uniform in selected visual characteristics or having a predetermined relationship, thus minimizing the pasted appearance that can result from simply combining the images together and also provide a more visually appealing product to the customer. Further, since this can be done automatically by the CPU, very little or no additional time is required by the operator to produce a high quality merged image.

It is to be understood that various other changes and modifications may be made without departing from the scope of the present invention. The present invention being defined by the following claims.

PARTS LIST

10 . . . central processing unit
11,13 . . . data link system
12,14,16,18,20,22 . . . input devices
32,34,36,38,40,42 . . . output devices
44 . . . server
100,120,142 . . . digital prestored image
102 . . . location
110,130,140 . . . customer generated digital image
150,152,154,156,158 . . . step

What is claimed is:

1. A method of combining at least one customer generated digital image with at least one prestored digital image to form a merged digital image, comprising the steps of:

a) selecting a prestored digital image, said prestored digital image having at least one predetermined location where a customer generated digital image may be placed, said prestored digital image having a design attribute of a predetermined value contributing to a visual characteristic when printed or displayed;

b) providing at least one capture means for obtaining at least one customer generated digital image in digital form;

c) providing at least one output means for printing, displaying, transferring or storing of a merged digital image formed of said at least one customer generated digital image and said prestored digital image;

d) capturing at least one customer generated digital image with said capture means, said customer generated digital image having a design attribute of a value differing from said predetermined value of said design attribute of said prestored digital image, and contributing to a visual characteristic when printed or displayed differing from the visual characteristic of said prestored digital image;

e) automatically analyzing said design attribute of said customer generated digital image to obtain an analyzed value of said design attribute of said customer generated digital image;

f) automatically adjusting said design attribute of said customer generated digital image or said prestored digital image based on the predetermined value of the design attribute of the prestored digital image and the analysis of the design attribute of said customer generated digital image, to establish a predetermined relationship between said predetermined value of said design attribute of said prestored digital image and said analyzed value of said design attribute of said customer generated digital image;

g) merging said customer generated digital image with said prestored digital image into a merged digital image with said predetermined relationship between said predetermined value and said analyzed value; and h) forwarding said merged digital image to said output means.

2. The method according to claim 1 wherein said predetermined relationship is substantially the same values of the design attributes of said prestored digital image and said customer generated digital image.

3. The method according to claim 1 wherein said prestored image has two locations for receiving customer generated digital images, and wherein:

step d) further comprises the step of capturing two customer generated digital images for placement at said two locations; and step e) further comprises the step of analyzing said two customer generated digital images for said design attribute to obtain two respective analyzed values of said design attribute; and step f) further comprises the step of automatically adjusting said design attributes of said two customer generated digital images or said prestored digital image such that said predetermined value of said design attribute of said prestored digital image and said two analyzed values of said design attribute of said two customer generated digital images correspond to a predetermined relationship.

4. The method according to claim 1 wherein said design attribute comprises density.

5. The method according to claim 1 wherein said design attribute comprises sharpness.

6. The method according to claim 1 wherein said design attribute comprises color balance.

7. The method according to claim 1 wherein said design attribute comprises saturation.

8. The method according to claim 2 wherein said design attribute comprises density.

9. The method according to claim 2 wherein said design attribute comprises sharpness.

10. The method according to claim 2 wherein said design attribute comprises color balance.

11. The method according to claim 2 wherein said design attribute comprises saturation.

* * * * *